Sept. 13, 1966 G. C. WOOD 3,272,515
MILL MIXER AND SPREADER WITH TWIN COMPARTMENTS
Filed May 12, 1964
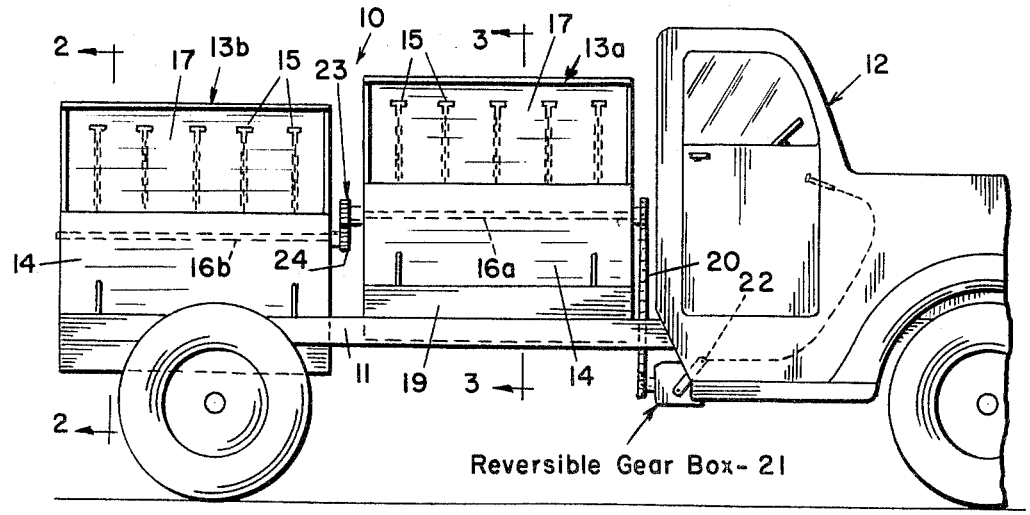
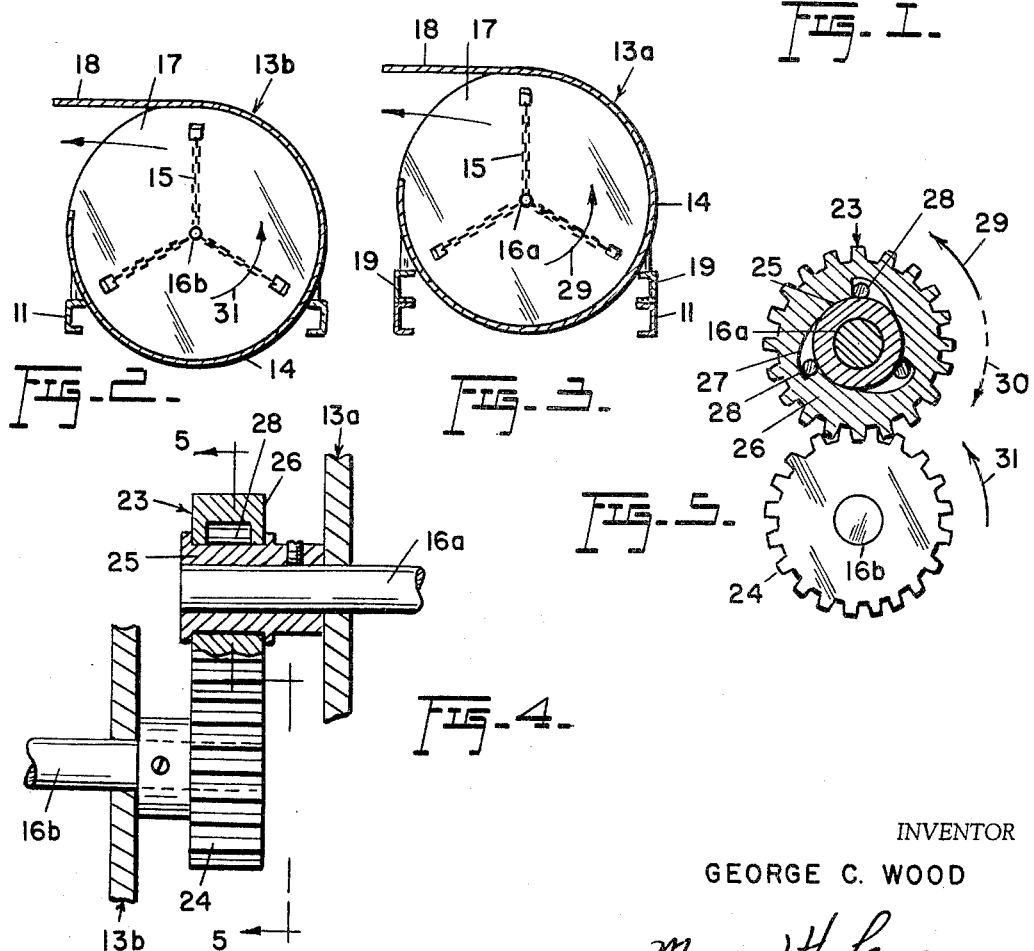
INVENTOR
GEORGE C. WOOD
BY Munson H. Lane
ATTORNEY

United States Patent Office 3,272,515
Patented Sept. 13, 1966

3,272,515
MILL MIXER AND SPREADER WITH TWIN COMPARTMENTS
George C. Wood, Darf Corp., Edenton, N.C.
Filed May 12, 1964, Ser. No. 366,855
5 Claims. (Cl. 275—3)

This invention relates to new and useful improvements in combined mills, mixers and spreaders for material such as silage, manure, or the like, wherein the material is placed in a box-like body or housing containing a rotatable beater unit which functions to break up, mix and ultimately throw out the material onto the ground or into a trough, as the case may be.

Conventional devices of this general type are usually mounted on a wagon which is pulled by a tractor, the power take-off of the latter usually being utilized for imparting rotation to the beater unit. Inasmuch as the power available at the power take-off is limited, and inasmuch as a substantial amount of power is required for the rotating beater unit to properly mix, break up and spread the material on which it is acting, a limitation is encountered in the practical size of the beater unit and of the material housing in which the unit operates, with a corresponding limitation in the amount or volume of material which can be handled in a single load. For example, if the beater unit in a housing of a given size requires a given horsepower for its operation, the amount of material handled in one load cannot be arbitrarily doubled by merely doubling the size of the housing, unless the horsepower applied to the beater unit is also doubled which, of course, is not possible if such double power is not available at the power take-off.

It is, therefore, the principal object of this invention to avoid the limitations above outlined and to provide an arrangement wherein twice as much material can be handled in a single load by a given horsepower than was heretofore possible, or conversely, wherein a given amount of material can be handled by only one-half the horsepower heretofore required.

This object is attained by providing, in place of a conventional housing of a given size, two separate housings of half that size each, with a separate beater unit in each of the two housings. The beater unit in one of the two housings is driven from the power take-off through a reversible gear box and an over-running clutch connects the beater unit of the second housing to the first beater unit, the arrangement being such that when the first beater unit is driven in one direction to act upon the material in the first housing, the drive does not pass through the over-running clutch and the second beater unit is inoperative. Then, when all the material in the first housing has been discharged, the gear box is reversed to drive the first beater unit in the opposite direction, such drive passing through the over-running clutch to the second beater unit which acts upon the material in the second housing. As another feature of the invention, the over-running clutch is combined with gearing to reverse the direction of rotation in a manner which enables both beater units to throw material in the same direction from the machine.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view of the combined mill, mixer and spreader of the invention mounted on the bed of a truck;

FIGURE 2 is a cross-sectional view, taken substantially in the plane of the line 2—2 in FIGURE 1;

FIGURE 3 is a cross-sectional view, taken substantially in the plane of the line 3—3 in FIGURE 1;

FIGURE 4 is an enlarged detail, partly in elevation and partly in section, of the over-running clutch and associated structure; and FIGURE 5 is a sectional view, taken substantially in the plane of the line 5—5 in FIGURE 4.

Referring now to the accompanying drawings in detail, the combined mill, mixer and spreader of the invention is designated in FIGURE 1 by the general reference numeral 10 and for illustrative purposes is shown as being mounted on the chassis 11 of a truck 12, or the like. However, it is to be understood that alternatively the apparatus may be mounted on a wagon drawn by a tractor, or it may rest in a fixed position on the ground.

In any event, the apparatus 10 comprises a pair of individual milling, mixing and spreading units 13a, 13b which are similarly constructed and each includes a cylindrical housing 14 containing a suitable beater unit 15, the latter being rotatable and carried by a drive shaft disposed axially in the housing. The drive shafts of the two beater units are indicated at 16a, 16b, respectively. It will be also observed that each housing 14 is provided with a lateral discharge opening 17 and with a material deflector 18, so that when the beater units are in operation, the material milled and mixed in the housings may be thrown out laterally to one side of the truck.

The housings of the two units 13a, 13b are placed end to end but while the unit 13b is mounted directly on the chassis 11, the unit 13a is supported my channels 19 on the chassis, so that the drive shaft 16a of the unit 13a is somewhat higher than the shaft 16b of the unit 13b, as will be readily apparent from FIGURE 1.

The front end of the drive shaft 16a of the unit 13a is connected by a sprocket chain drive 20 to a reversible gear box 21 which is driven by the power take-off of the truck; or by the power take-off of a tractor if the apparatus is mounted on a tractor-drawn wagon; or by a suitable motor or engine if the apparatus is fixedly positioned on the ground. In any event, the reversing of the gear box 21 is effected by a suitable control, as indicated at 22, for example, it being understood that by virtue of the reversible gear box, the drive shaft 16a of the unit 13a may be selectively rotated in either direction.

The rear end of the drive shaft 16a is connected to the front end of the drive shaft 16b of the second unit 13b by means which include an over-running clutch 23 and gear means 24. The clutch 23 comprises an inner clutch member 25 which is secured to the shaft 16a for rotation therewith, an outer clutch member 26 having cam recesses 27 therein, and a set of rollers 28 in the recesses, the arrangement being such that when the shaft 16a is rotated in one direction, as for example in the direction shown by the solid arrow 29 in FIGURE 5, no drive is transmitted from the clutch member 25 to the member 26. However, when the shaft 16a is rotated as shown by the dotted arrow 30, the clutch member 26 is driven by the member 25 in the direction of that arrow. It may be pointed out that the over-running clutch arrangement as illustrated is by way of an example only, the particular structure of the clutch per se not being critical and any conventional over-running or "one-way" clutch may be employed.

The peripheral portion of the clutch member 26 is in the form of a gear which meshes with the aforementioned gear 24, the latter being secured to and rotatable with the drive shaft 16b of the second unit 13b. The gear arrangement 26, 24 reverses the direction of rotation of the shaft 16b relative to the clutch member 26, so that when the shaft 16a is rotated in the direction of the arrow 30 and the clutch member 26 rotates in the same direction, the shaft 16b rotates in the direction of the arrow 31. Of course, when the shaft 16a turns in the direction 29, the shaft 16b does not rotate at all, but it is to be noted that when the shaft 16b turns in the direction 31, that direction is the same as the direction 29 of the shaft 16a.

In operation, both housings 14 of the two units 13a, 13b are loaded with material and the control 22 of the reversible gear box 21 is set so as to rotate the shaft 16a of the first unit 13a in the direction 29, thus milling and mixing the material in the housing of the first unit and discharging the same through the lateral opening 17 of that housing. During this procedure the clutch 23 permits the second unit 13b to remain inoperative, so power is needed to actuate the first unit 13a only. When all the material has been discharged from the housing of the first unit 13a, the gear box 21 is reversed so as to turn the shaft 16a in the direction 30, thus transmitting drive from the shaft 16a through the clutch to the shaft 16b, which turns in the direction 31 to mill, mix and discharge material from the housing of the second unit 13b to the same side of the truck as it had been discharged from the first unit 13a. During this phase of the procedure, the beater in the first unit 13a rotates in the direction 30, but since that unit is empty, the power used to rotate the beater is insignificant and virtually all the power is available for actuating the second unit 13b, as will be clearly apparent.

Thus, by substituting for a conventional unit of a given size and capacity two units of half that size and operatively interconnecting such units as described, twice the amount of material can be handled in a single load with a given amount of power, or conversely, half the power can be used to handle a given amount of material, in comparison to conventional arrangements.

While in the foregoing there has been described and shown the preferred embodiment of the invention, various modifications and equivalents may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a material mill, mixer and spreader, the combination of first and second milling, mixing and spreading units each including a material container having a discharge opening and first and second rotatable beater and unloader assemblies provided in the containers of the respective first and second units for discharging material through the container openings, drive means including an over-running clutch operatively connecting the second rotatable assembly to the first rotatable assembly whereby the second assembly may remain stationary when the first assembly is rotated in one direction but whereby the second assembly may be rotated when the first assembly is rotated in the relatively opposite direction, and power actuated means for rotating said first assembly selectively in opposite directions.

2. The combination as defined in claim 1 wherein said over-running clutch includes first and second clutch members operatively connected to the first and second rotatable assemblies respectively, and means coacting with said first and second clutch members for driving the second clutch member by the first clutch member in one direction only.

3. The combination as defined in claim 1 wherein said first mentioned drive means including said over-running clutch also includes means for rotating the second rotatable assembly in a direction opposite to the first assembly when said clutch is operative to transmit rotation of the first assembly to the second assembly.

4. The combination as defined in claim 1 wherein said last mentioned drive means for rotating the first assembly comprises a reversible gear box driven by a power source and operatively connected to said first rotatable assembly.

5. In a material mill, mixer and spreader, the combination of first and second milling, mixing and spreading units disposed in tandem and each including a material container having a lateral discharge opening at the same side of said units, first and second rotatable beater and unloader assemblies provided in the containers of the respective first and second units for discharging material through the container openings, drive means operatively connecting the second rotatable assembly to the first rotatable assembly, said drive means including an over-running clutch whereby the second assembly may remain stationary when the first assembly is rotated in one direction but whereby the second assembly may be rotated when the first assembly is rotated in the relatively opposite direction, said drive means also including gearing for rotating the second assembly in a direction opposite to the first assembly when said clutch is operative to transmit rotation of the first assembly to the second assembly, and a power driven reversible gear box operatively connected to said first rotatable assembly for rotating the same selectively in opposite directions.

References Cited by the Examiner

UNITED STATES PATENTS

| | | | |
|---|---|---|---|
| 2,836,085 | 5/1958 | Snyder | 74—812 |
| 2,957,698 | 10/1960 | Martens | 275—3 |
| 3,055,551 | 9/1962 | Johnson | 222—66 X |
| 3,175,829 | 3/1965 | Ferris | 275—3 |

ANTONIO F. GUIDA, *Acting Primary Examiner.*

WILLIAM A. SMITH III, *Examiner.*